United States Patent [19]

Conger

[11] 4,235,492
[45] Nov. 25, 1980

[54] VEHICULAR AUDIO EQUIPMENT SECURING DEVICE

[76] Inventor: Thurman W. Conger, P.O. Box 995, Wewoka, Okla. 74884

[21] Appl. No.: 33,901

[22] Filed: Apr. 27, 1979

[51] Int. Cl.³ .................. A47B 67/02; E05B 65/46
[52] U.S. Cl. ................................. 312/242; 292/56; 312/107.5; 312/219; 312/333
[58] Field of Search ............... 312/219, 333, 242, 215, 312/107.5; 70/85, 58; 292/56, 218, 214

[56] References Cited

U.S. PATENT DOCUMENTS

| | | | |
|---|---|---|---|
| 69,068 | 9/1867 | Brada | 312/333 X |
| 1,853,326 | 4/1932 | Walker | 292/214 |
| 3,447,850 | 6/1969 | Samson | 312/319 X |
| 3,538,724 | 11/1970 | Dauenbaugh | 312/333 X |
| 3,649,095 | 3/1972 | Gunzburg | 312/333 |
| 4,010,989 | 3/1977 | Klug | 312/333 |
| 4,066,307 | 1/1978 | Barding | 312/242 |

Primary Examiner—James T. McCall
Attorney, Agent, or Firm—Daniel Jay Tick

[57] ABSTRACT

A pair of parallel support members extend behind and perpendicularly to the dashboard of an automotive vehicle at the sides of the opening of the dashboard. Guide devices are provided on the sides of the unit housing of audio equipment and on the support members in cooperative engagement for slidably mounting the unit housing behind the dashboard. The dashboard has a hole formed therethrough in close proximity with the opening therethrough. A slot is formed through the top or bottom of the unit housing equidistant from the sides thereof intermediate the front and back of the unit housing. A pin is secured in the unit housing in operative proximity with the slot and is accessible via the slot. The pin and the slot are mutually perpendicular. A key-operated lock is mounted in the hole through the dashboard. A securing arm is rotatably affixed to the lock behind the dashboard and is rotatable by a key in the lock to an unlocked position in which the arm is in spaced relation with, and at a distance from, the unit housing and the slot and pin of the unit housing whereby the audio equipment unit is freely removable from the dashboard, and to a locked position at an angle with the unlocked position in which the arm extends through the slot and is hooked to the pin and locked in position whereby the arm obstructs movement of the unit housing through the opening of the dashboard so that the unit is secured behind the dashboard.

4 Claims, 4 Drawing Figures

VEHICULAR AUDIO EQUIPMENT SECURING DEVICE

BACKGROUND OF THE INVENTION

The present invention relates to a vehicular audio equipment securing device. More particularly, the invention relates to a vehicular audio equipment securing device for releasably securing an audio equipment unit in an automotive vehicle having a dashboard with an opening formed therethrough, the audio equipment unit being accommodated in the opening of the dashboard and having a unit housing with a top, a bottom, a front, a back and a pair of spaced parallel sides.

The removal of audio equipment such as, for example, radios, tape decks, and the like, from automotive vehicles is necessitated rather frequently in new vehicles, due to defects in the initial manufacture of such equipment. It is very difficult to remove audio equipment from automotive vehicles. Due to the difficulty of removal, much labor is required, so that the removal is very expensive and time consuming.

The principal object of the invention is to provide a vehicular audio equipment securing device of simple structure, which removably secures audio equipment in an automotive vehicle against theft.

An object of the invention is to provide a vehicular audio equipment securing device which permits the removal of the audio equipment for repair, or other purposes, with facility, convenience and rapidity, while removably securing such equipment from unauthorized removal from the vehicle.

Another object of the invention is to provide a vehicular audio equipment securing device of simple structure, which is inexpensive in manufacture, installed in an automotive vehicle with facility, convenience and rapidity, and permits the equipment to be removed, as desired, by authorized people, while preventing its removal by unauthorized people.

Still another object of the invention is to provide a vehicular audio equipment securing device of simple structure, which is installed inexpensively in an automotive vehicle and permits the securing of audio equipment in the vehicle via a key-operated lock, while facilitating the removal of such equipment via such lock.

BRIEF SUMMARY OF THE INVENTION

In accordance with the invention, a vehicular audio equipment securing device for releasably securing an audio equipment unit in an automotive vehicle having a dashboard with an opening formed therethrough, said audio equipment unit being accommodated in the opening of the dashboard and having a unit housing with a top, a bottom, a front, a back and a pair of spaced parallel sides, comprises a pair of spaced parallel support members extending behind and substantially perpendicularly to the dashboard at the sides of the opening of the dashboard. Guide devices on the sides of the unit housing and on the support members are in cooperative engagement for slidably mounting the unit housing behind the dashboard. The dashboard has a hole formed therethrough in close proximity with the opening therethrough. A slot is formed through one of the top and bottom of the unit housing equidistant from the sides thereof intermediate the front and back of the unit housing. A pin is secured in the unit housing in operative proximity with the slot and is accessible via the slot. The pin and the slot are mutually perpendicular. A key-operated lock is mounted in the hole through the dashboard. A securing arm is rotatably affixed to the lock behind the dashboard and is rotatable by a key in the lock to an unlocked position in which the arm is in spaced relation with and at a distance from the unit housing and the slot and pin of the unit housing whereby the audio equipment unit is freely removable from the dashboard, and to a locked position at an angle with the unlocked position in which the arm extends through the slot and is hooked to the pin and locked in position whereby the arm obstructs movement of the unit housing through the opening of the dashboard so that the unit is secured behind the dashboard.

The arm has a free end bent in substantially C-type configuration for releasably hooking to the pin.

The slot is substantially parallel to the front and back of the unit housing and the arm is rotatable in a plane through the center of the slot and parallel to the front and back of the unit housing.

An additional opening is formed through the dashboard. An additional audio equipment unit is accommodated in the additional opening of the dashboard and has an additional unit housing with a top, a bottom, a front, a back and a pair of spaced parallel sides. An additional pair of spaced parallel support members extend behind and substantially perpendicularly to the dashboard at the sides of the additional opening of the dashboard. Additional guide devices on the sides of the additional unit housing and on the additional support members are in cooperative engagement for slidably mounting the additional unit housing behind the dashboard. The hole formed through the dashboard is between the opening and the additional opening of the dashboard. An additional slot is formed through the other of the top and bottom of the additional unit housing equidistant from the sides thereof intermediate the front and back of the additional unit housing. An additional pin is secured in the additional unit housing in operative proximity with the additional slot and accessible via the additional slot. The additional pin and the additional slot are mutually perpendicular. The securing arm in its unlocked position is in spaced relation with, and at a distance from, the additional unit housing and the additional slot and additional pin of the additional unit housing whereby the additional audio equipment unit is freely movable from the dashboard, and in its locked position extends through the additional slot and is hooked to the additional pin and locked in position whereby the arm obstructs movement of the additional unit housing through the additional opening of the dashboard so that the additional unit is secured behind the dashboard.

The arm has a substantially linear stem and spaced opposite first and second free ends, each bent in substantially C-type configuration for releasably hooking to a corresponding one of the pins. The first and second ends extend coplanarly from opposite sides of the stem and form a substantially S-type configuration.

The additional slot is substantially parallel to the front and back of the additional unit housing and the plane of rotation of the arm extends through the center of the additional slot and parallel to the front and back of the additional unit housing.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
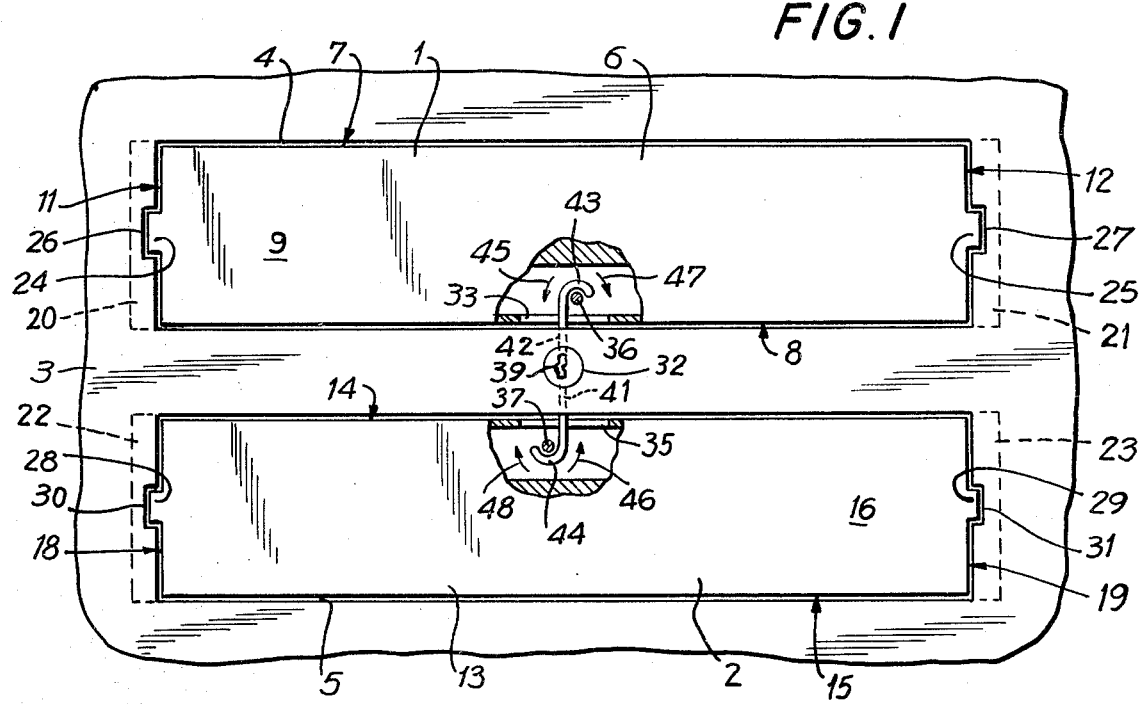
FIG. 1 is a front view, partly cut away and partly in section, of an embodiment of the vehicular audio equipment securing device of the invention, installed in the dashboard of an automotive vehicle.
Figure 2:
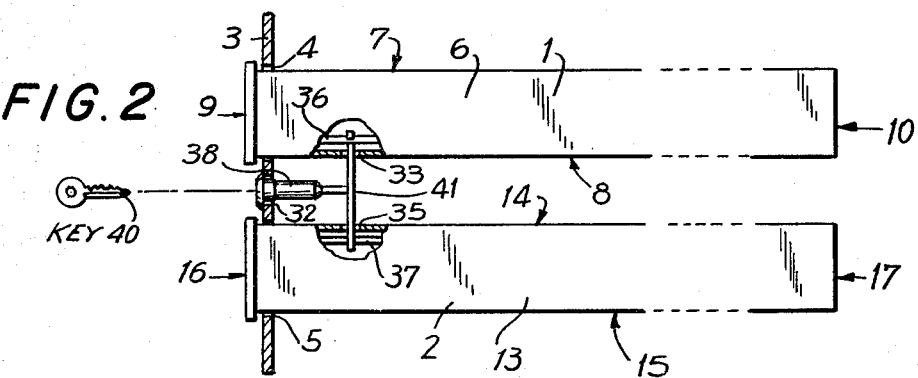
FIG. 2 is a side view, on a reduced scale, partly cut away and partly in section, of the embodiment of FIG. 1, installed in the dashboard of an automotive vehicle.

The vehicular audio equipment securing device of the invention releasably secures an audio equipment unit 1 and an audio equipment unit 2 (FIGS. 1 and 2) in an automotive vehicle having a dashboard 3 with openings 4 and 5 formed therethrough, as shown in FIGS. 1 and 2. The audio equipment units 1 and 2 may comprise any audio equipment such as, for example, an AM radio, an FM radio, a CB radio, a tape deck, and the like. The audio equipment unit 1 is accommodated in the opening 4 of the dashboard 3 and the audio equipment unit 2 is accommodated in the opening 5 of said dashboard, as shown in FIGS. 1 and 2.

The audio equipment unit 1 has a unit housing 6 (FIGS. 1, 2 and 4) with a top 7 (FIGS. 1 and 2), a bottom 8 (FIGS. 1, 2 and 4), a front 9 (FIGS. 1, 2 and 4) and a back 10 (FIG. 2). The unit housing 6 also has a pair of spaced parallel sides 11 and 12 (FIG. 1).

The audio equipment unit 2 has a unit housing 13 (FIGS. 1 and 2) with a top 14 (FIGS. 1 and 2), a bottom 15 (FIGS. 1 and 2), a front 16 (FIGS. 1 and 2) and a back 17 (FIG. 2). The unit housing 13 also has a pair of spaced parallel sides 18 and 19 (FIG. 1).

The vehicular audio equipment securing device comprises a first pair of spaced parallel support members 20 and 21 and a second pair of spaced parallel support members 22 and 23 (FIG. 1) extending behind, and substantially perpendicular to, the dashboard 3 at the sides of the openings 4 and 5, respectively, of said dashboard.

Guide devices 24 and 25 are provided on the sides 11 and 12, respectively, of the first unit housing 6 and guide devices 26 and 27 are provided on the first pair of support members 20 and 21, respectively, in cooperative engagement for slidably mounting said first unit housing behind the dashboard 3 with the front 9 of said first unit housing substantially coplanar with the face of said dashboard (FIG. 1). The guide devices 24 and 25 on the sides 11 and 12, respectively, of the first unit housing 6 comprise tracks or rails extending beyond said sides along the length of said first unit housing, equidistant from the top and bottom 7 and 8 thereof and parallel to said top and bottom (FIG. 1). The guide devices 26 and 27 of the first pair of support members 20 and 21, respectively, comprise grooves formed in surfaces of said support members facing the sides 11 and 12, respectively, of said first unit housing (FIG. 1). The tracks or rails 24 and 25 are accommodated, and are slidably moved, in the grooves 26 and 27, respectively.

Guide devices 28 and 29 are provided on the sides 18 and 19, respectively, of the second unit housing 13 and guide devices 30 and 31 are provided on the second pair of support members 22 and 23, respectively, in cooperative engagement for slidably mounting said second unit housing behind the dashboard 3 with the front 16 of said second unit housing substantially coplanar with the face of said dashboard (FIG. 1). The guide devices 28 and 29 on the sides 18 and 19, respectively, of the second unit housing 13 comprise tracks or rails extending beyond said sides along the length of said second unit housing, equidistant from the top 14 and the bottom 15 thereof and parallel to said top and bottom (FIG. 1). The guide devices 30 and 31 of the second pair of support members 22 and 23, respectively, comprise grooves formed in surfaces of said supporting members facing the sides 18 and 19, respectively of said second unit housing (FIG. 1). The tracks or rails 28 and 29 are accommodated, and are slidably moved, in the grooves 30 and 31, respectively.

The dashboard 3 has a hole 32 formed therethrough between the openings 4 and 5 of said dashboard, as shown in FIGS. 1 and 2.

Figure 4:
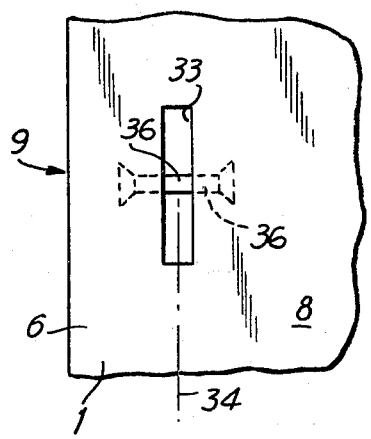
FIG. 4 is a view, on an enlarged scale, of the slot and pin of a unit housing secured by the audio equipment securing device of the invention.

A first slot 33 is formed through the bottom 8 of the first unit housing 6 equidistant from the sides 11 and 12 thereof and intermediate the front 9 and back 10 of said first unit housing (FIGS. 1, 2 and 4). The first slot 33 is substantially parallel to the front 9 and the back 10 of the first unit housing 6 and has a plane 34 (FIG. 4) through its center and parallel to said front and back of said first unit housing.

A second slot 35 is formed through the top 14 of the second unit housing 13, equidistant from the sides 18 and 19 thereof and intermediate the front 16 and the back 17 of said second unit housing (FIGS. 1 and 2). The second slot 35 is substantially parallel to the front 16 and the back 17 of the second unit housing 13 and has a plane through the center thereof which is parallel to said front and said back of said second unit housing. The plane through the center of the second slot 35 is not shown in the FIGS., but is the plane 34 through the center of the first slot 33 when the first and second unit housings 6 and 13 are in their locked positions, substantially as shown in FIG. 2.

A first pin 36 is secured in the first unit housing 6 in operative proximity with the first slot 33 and is accessible via said first slot, as shown in FIGS. 1, 2 and 4. The first pin 36 and the first slot 33 are mutually perpendicular, as shown in the FIGS.

A second pin 37 is secured in the second unit housing 13 in operative proximity with the second slot 35 and is accessible via said second slot, as shown in FIGS. 1 and 2. The second pin 37 and the second slot 35 are mutually perpendicular, as shown in the FIGS.

Figure 3:
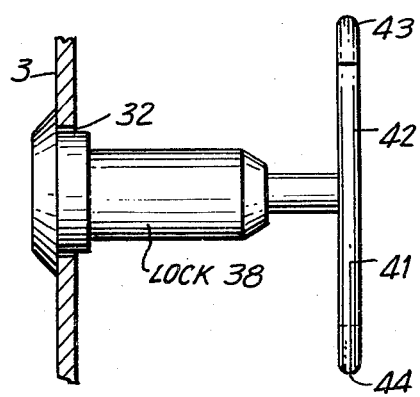
FIG. 3 is a side view, on an enlarged scale, partly cut away, of an embodiment of the key-operated lock and securing arm of the vehicular audio equipmet securing device of the invention.

A key-operated lock 38 is mounted in the hole 32 through the dashboard 3, as shown in FIGS. 2 and 3. The key-operated lock 38 has a keyhole 39 (FIG. 1) for accommodating a key 40 (FIG. 2) which operates said lock.

A securing arm 41 (FIGS. 1 to 3) is rotatably affixed to the lock 38 behind the dashboard 3, as shown in FIGS. 2 and 3. The arm 41 is positioned so that it is rotatable in the plane 34 (FIG. 4) through the centers of the first and second slots 33 and 35 when the first and second unit housings 6 and 13 are substantially in their locked positions (FIGS. 1 and 2). The securing arm 41 has a substantially linear stem 42 (FIGS. 1 and 3) and spaced opposite first and second free ends 43 and 44, respectively, as shown in FIGS. 1 and 3. Each of the free ends 43 and 44 of the arm 41 is bent in substantially C-type configuration, as shown in FIG. 1, for releasably hooking to the corresponding first and second pins 36 and 37, respectively, as shown in FIG. 1. The first and second ends 43 and 44 extend coplanarly from opposite sides of the stem 42 and form a substantially S-type configuration, as shown in FIG. 1.

The securing arm 41 is rotated by the key 40 (FIG. 2) in the lock 38 (FIG. 3) to an unlocked position (not shown in the FIGS.) in which said arm is in spaced relation with, and at a distance from, the first and second unit housings 6 and 13, respectively, and the first and second slots 33 and 35 and the first and second pins 36 and 37, respectively, of said unit housings. Thus, in the unlocked position of the arm 41, the audio equipment units 1 and 2 are freely removable from the dashboard 3.

The securing arm 41 is rotatable by the key 40 (FIG. 2) in the lock 38 (FIG. 3) to a locked position, as shown in FIGS. 1 and 2. In its locked position, the arm 41 extends through the first and second slots 33 and 35, respectively, and is hooked to the first and second pins 37 and 38, respectively, and is locked in position. More particularly, the first end 43 of the arm 41 extends through the first slot 33, into the first unit housing 6 and is hooked to the first pin 36 and the second end 43 of said arm extends through the second slot 35 into the second unit housing 13 and is hooked to the second pin 37, when said arm is in its locked position. Thus, when the securing arm 41 is in its locked position, it obstructs movement of the first and second unit housings 6 and 13 through the openings 4 and 5, respectively, of the dashboard 3, so that said unit housings and the audio equipment units 1 and 2, respectively, housed therein are secured behind said dashboard.

The key 40 is inserted in the keyhole 39 (FIG. 1) of the lock 38 (FIG. 3) and is rotated in counterclockwise direction, indicated by arrows 45 and 46 in FIG. 1, the securing arm 41 is rotated through the first and second slots 33 and 35 and out of the first and second unit housings 6 and 13, respectively. When the key 40 is inserted in the keyhole 39 of the lock 38 and is rotated clockwise, the securing arm 41 is rotated clockwise, as indicated by arrows 47 and 48 in FIG. 1, and is moved through the first and second slots 33 and 35, respectively, into the first and second unit housings 6 and 13, respectively, and its ends are hooked to the first and second pins 36 and 37, respectively, to prevent the movement of said unit housings thereby locking them securely behind the dashboard.

While the invention has been described by means of a specific example and in a specific embodiment, I do not wish to be limited thereto, for obvious modifications will occur to those skilled in the art without departing from the spirit and scope of the invention.

I claim:

1. A vehicular audio equipment securing device for releasably securing an audio equipment unit in an automotive vehicle having a dashboard with an opening formed therethrough, said audio equipment unit being accommodated in the opening of the dashboard and having a unit housing with a top, a bottom, a front, a back and a pair of spaced parallel sides, said vehicular audio equipment securing device comprising a pair of spaced parallel support members extending behind and substantially perpendicularly to the dashboard at the sides of the opening of said dashboard;

guide means on the sides of the unit housing and on the support members in cooperative engagement for slidably mounting said unit housing behind said dashboard, said dashboard having a hole formed therethrough in close proximity with the opening therethrough;

a slot formed through one of the top and bottom of said unit housing equidistant from the sides thereof intermediate the front and back of said unit housing, said slot being substantially parallel to the fornt and back of said unit housing;

a pin secured in said unit housing in operative proximity with said slot and accessible via said slot, said pin and said slot being mutually perpendicular;

a key-operated lock mounted in the hold through said dashboard; and a securing arm rotatably affixed to the lock behind said dashboard and rotatable, in a plane through the center of said slot and parallel to said front and back of said unit housing, by a key in said lock to an unlocked position in which the arm is in spaced relation with and at a distance from said unit housing and the slot and pin of said unit housing whereby said audio equipment unit is freely removable from said dashboard, and to a locked positon at an angle with said unlocked position in which said arm extends through said slot and is hooked to said pin and locked in position whereby said arm obstructs movement of said unit housing through said opening of said dashboard so that said unit is secured behind said dashboard, said arm having a free end bent in substantially C-type configuration for releasably hooking to said pin.

2. A vehicular audio equipment securing device as claimed in claim 1, further comprising an additional opening formed through said dashboard, an additional audio equipment unit being accommodated in the additional opening of the dashboard and having an additional unit housing with a top, a bottom, a front, a back and a pair of spaced parallel sides, an additional pair of spaced parallel support members extending behind and substantially perpendicularly to the dashboard at the sides of the additional opening of said dashboard, additional guide means on the sides of the additional unit housing and on the additional support members in cooperative engagement for slidably mounting said additional unit housing behind said dashboard, said hole formed through said dashboard being between said opening and said additional opening of said dashboard, an additional slot formed through the other of the top and bottom of said additional unit housing equidistant from the sides thereof intermediate the front and back of said additional unit housing, an additional pin secured in said additional unit housing in operative proximity with said additional slot and accessible via said additional slot, said additional pin and said additional slot being mutually perpendicular, said securing arm in its unlocked position being in spaced relation with and at a distance from said additional unit housing and the additional slot and additional pin of said additional unit housing whereby said additional audio equipment unit is freely movable from said dashboard, and in its locked position extending through said additional slot and being hooked to said additional pin and locked in position whereby said arm obstructs movement of said additional unit housing through said additional opening of said dashboard so that said additional unit is secured behind said dashboard.

3. A vehicular audio equipment securing device as claimed in claim 2, wherein said arm has a substantially linear stem and spaced opposite first and second free ends each bent in substantially C-type configuration for releasably hooking to a corresponding one of said pins, the first and second ends extending coplanarly from opposite sides of said stem and forming a substantially S-type configuration.

4. A vehicular audio equipment securing device as claimed in claim 3, wherein said additional slot is substantially parallel to the front and back of said additional unit housing and the plane of rotation of said arm extends through the center of said additional slot and parallel to said front and back of said additional unit housing.

* * * * *